United States Patent [19]
Jantzen

[11] Patent Number: 4,504,047
[45] Date of Patent: Mar. 12, 1985

[54] SCISSOR SUPPORT FOR WELDING TANK SECTIONS

[75] Inventor: Steven L. Jantzen, St. Charles, Mo.

[73] Assignee: ACF Industries, Inc., New York, Nebr.W YORK

[21] Appl. No.: 378,316

[22] Filed: May 14, 1982

Related U.S. Application Data

[63] Continuation of Ser. No. 198,751, Oct. 20, 1980, abandoned.

[51] Int. Cl.$^3$ .............................................. B23Q 3/18
[52] U.S. Cl. ...................................... 269/43; 269/287; 269/289 MR; 269/58
[58] Field of Search ................. 269/289 MR, 43, 902, 269/287, 58; 228/49 R, 49 B, 44.1, 44.5, 48; 254/122, 9 R, 9 B, 9 C

[56] References Cited

U.S. PATENT DOCUMENTS

| | | | |
|---|---|---|---|
| 2,468,230 | 4/1949 | Pollard | 254/122 |
| 3,480,158 | 11/1969 | Pandjiris et al. | 228/48 |
| 3,715,101 | 2/1973 | Puhringer | 224/122 |
| 4,039,115 | 5/1977 | Randolph et al. | 228/48 |

Primary Examiner—Robert C. Watson
Attorney, Agent, or Firm—Henry W. Cummings

[57] ABSTRACT

A support and lift assembly for welded tank courses is provided outboard of a three ring cage used to internally circumferentially weld adjacent tank courses. The support and lift assembly is used to move the welded tank courses into position for another course to be welded on. A tank course conveyor extends longitudinally outboard of the cage. The conveyor is discontinuous at one or more positions and a scissors support and lift assembly is located at such discontinuous positions. A piston is pivotably connected to one of the arms which extends generally horizontally into a cylinder pivotably connected to the other arm. A roller course support is rotatably mounted at the end of each arm to support welded tank courses. A second piston extends vertically between the base and one of the arms and extends into a second cylinder extending vertically and connected to the other of the base and the arm. A first vertical height limit switch is located on the upper surface of a jack in the center ring. Another vertical height limit switch is located on a jack in the nearest end ring of the cage. Fluid pressure applied to the horizontal cylinder controlled by these limit switches displaces the piston head and moves the arms and respective rollers vertically to raise a tank course until aligned with the limit switches. A lateral stability limit switch is located on either the horizontal cylinder or piston which controls the flow of fluid to the vertical cylinder to control lateral stability.

21 Claims, 9 Drawing Figures

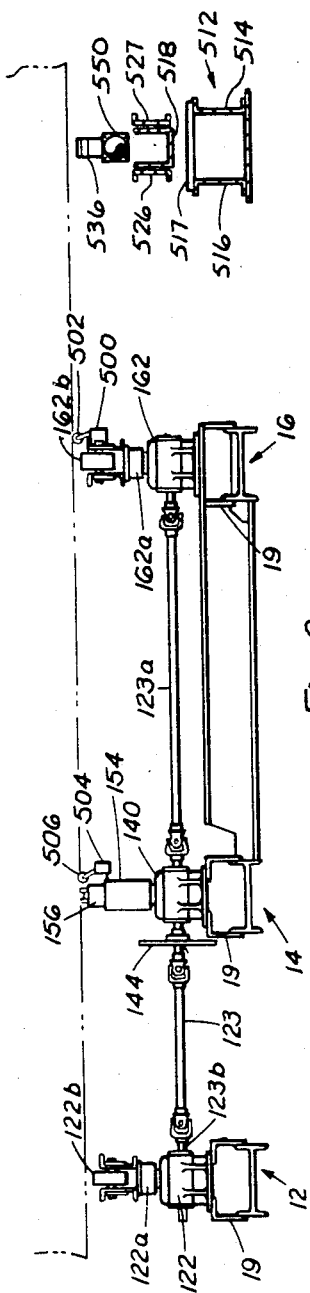
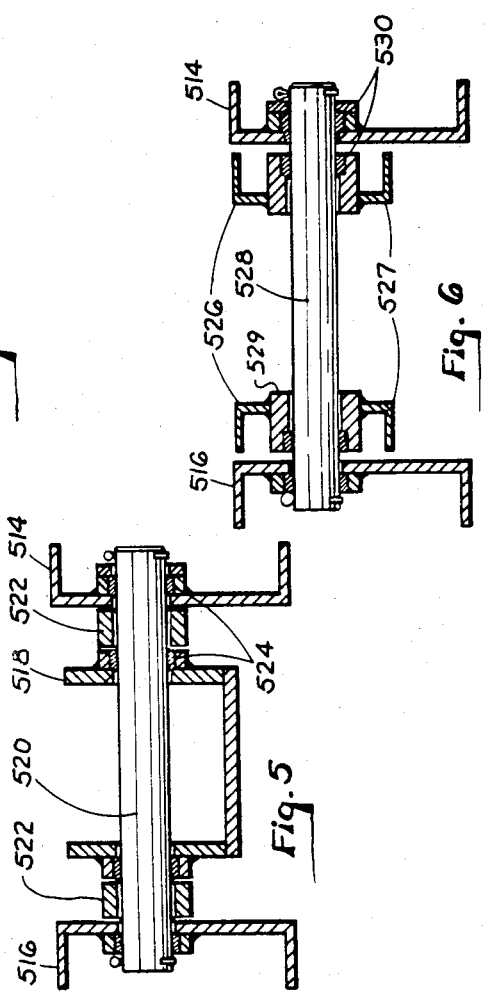
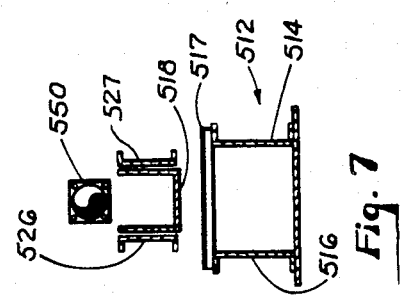

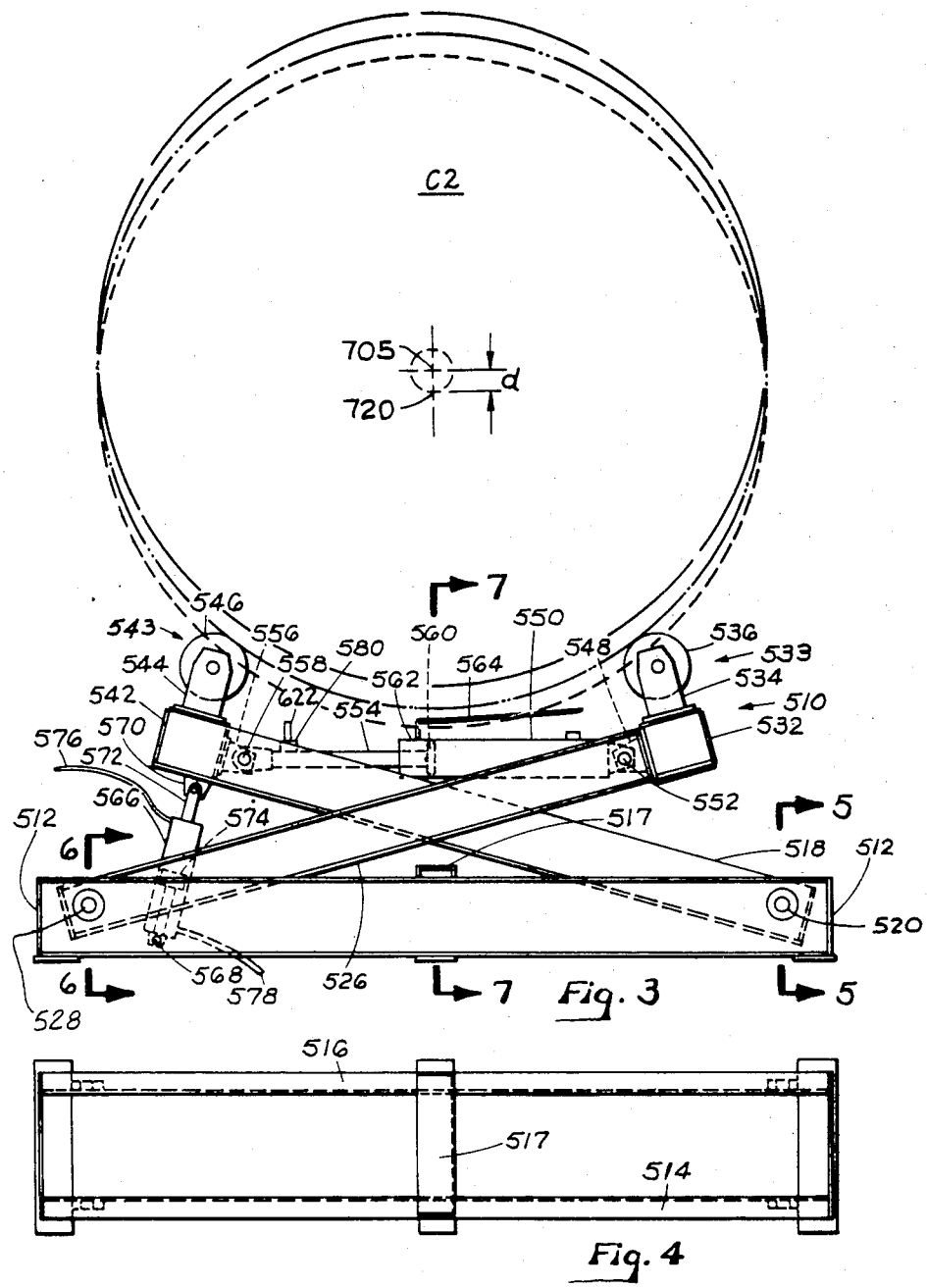

SCISSOR SUPPORT FOR WELDING TANK SECTIONS

This application is a continuation of Ser. No. 198,751, filed Oct. 20, 1980 now abandoned.

BACKGROUND OF THE INVENTION

In U.S. Pat. No. 4,081,651 apparatus is disclosed for supporting and rotating a pair of hollow tank sections of generally circular cross section, including scalene frusto-conical tank sections, during welding of the sections in end-to-end abutting relation to form an elongated tank. The apparatus includes three longitudinally spaced, axially aligned, rotatable ring which define a welding cage. The center ring includes a plurality of circumferentially spaced, radially directed jacks, each extendable the same distance regardless of the resistance encountered by a particular jack to force the abutting edges of the tank sections into a precise circular cross section and support and hold the abutting edges in aligned relation during rotation and welding. The two side rings include radially directed jacks in the bottom for lifting the sections and circumferentially spaced radially directed jacks of the seek-and-find type that will automatically extend until all jacks exert the same force on the tank sections extending from each side of the center ring to thereby support the tank sections for rotation about the common axis of the three rings, regardless of whether the tank sections are of cylindrical, right frusto-conical or scalene frusto-conical shape. A longitudinally extending conveyor is provided which extends within the welding cage and on either side of the welding cage for moving adjacent tank sections longitudinally toward each other into abutting engagement for welding, and for moving welded sections longitudinally of the cage.

However, after several courses have been circumferentially welded together the radially directed jacks in the outer ring supporting completed courses can no longer support and lift the welded courses into position for welding on an additional course.

The object of the present invention is to provide a support and lift assembly to work in conjunction with the radially directed jacks in the outer ring to move an assembly of several tank courses into position for welding on an additional tank course.

U.S. Pat. No. 3,480,158, in FIG. 1 illustrates circumferential welding of a pair of tanks 10 and 11 supported by rollers 12 and 16. The tanks are lifted into position by means of the roller supports 35 and 36 which are pivotably mounted at 33 and 34 upon the supports 26. Cylinders 43 and 46 having pistons 45 and 48 are thus used to lift the rolls into position.

However, this system has no provision for a scissors assembly to support cantilevered tank sections.

Moreover, it provides no accumulator and means for placing the accumulator in fluid communication with the cylinders as the courses are rotated for internal circumferential welding.

SUMMARY OF THE INVENTION

A support and lift assembly for welded tank courses is provided outboard of the three ring cage described in U.S. Pat. No. 4,081,651 to move the welded tank courses into position for another course to be welded on. A conveyor extends longitudinally outboard of the cage. The conveyor is discontinuous at one or more positions and a scissors support and lift assembly is located at such discontinuous positions. The support and lift assembly further includes a pair of transversely extending arms. The arms cross and one arm telescopes within the other. A piston is pivotably connected to one of the arms which extends generally horizontally into a horizontally extending cylinder pivotably connected to the other arm. A course support is rotatably mounted at the end of each arm to support welded tank courses. A second piston extends vertically between the base and one of the arms and extends into a second cylinder extending vertically and connected to the other of the base and the arm. A first vertical height limit switch is located on the upper surface of the lowest jack in the center ring. Another vertical height limit switch is located on a jack located outboard of the ring cage or in the nearest end ring of the cage. Fluid pressure applied to the horizontal cylinder controlled by these limit switches displaces the piston and moves the arms and respective rollers vertically to raise a tank course until aligned with the lower jack in the center ring. A lateral stability limit switch is located on either the horizontal cylinder or horizontal piston which controls the flow of fluid to the vertical cylinder to control lateral stability.

A control system for the support and lift system includes a fluid reservoir and a fluid pump. The pump applies fluid pressure to the lift and support cylinder through a control valve and to a fluid accumulator. The pump also applies fluid pressure to the lateral stability cylinder to provide adequate pressure. A lateral stability control valve includes a by-pass to avoid actuation of this cylinder during welding. The accumulator includes a liquid portion and an inert gas portion separated by a movable diaphragm or piston. During welding the diaphragm or piston is compressible to cushion the welded sections which are rotated.

IN THE DRAWINGS

FIG. 2 is a side elevation view of the lower portion of the welding apparatus shown in FIG. 1.

FIG. 3 is a vertical sectional view illustrating the scissor support assembly of the present invention.

FIG. 4 is a plan view of the lower support illustrated in FIG. 3.

FIG. 5 is a sectional view looking in the direction of the arrows along the line 5—5 in FIG. 3.

FIG. 6 is a sectional view looking in the direction of the arrows along the line 6—6 in FIG. 3.

FIG. 7 is a sectional view looking in the direction of the arrows along the line 7—7 in FIG. 3.

DESCRIPTION OF PREFERRED EMBODIMENTS

Figure 1:
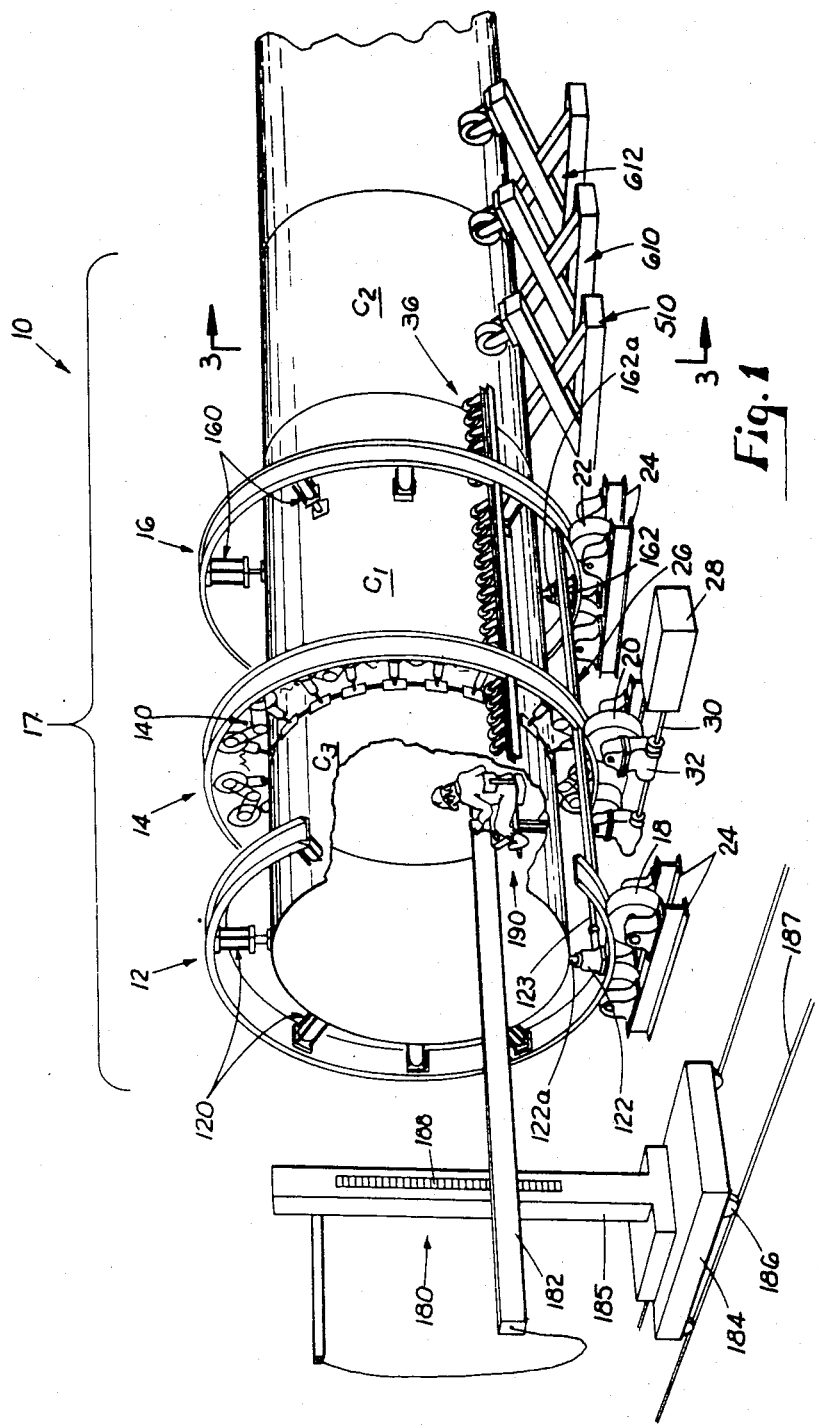
FIG. 1 is a schematic perspective view of the welding apparatus.

The present invention is related to the apparatus described and illustrated in U.S. Pat. No. 4,081,651. This patent in its entirety is hereby incorporated into the present application by this reference. In this patent a three ring cage 10 includes rings 12, 14 and 16 wherein courses $C_1$ and $C_2$ are internally circumferentially welded together at 190 as the cage rotates on rollers 18, 20 and 22. When courses $C_1$ and $C_2$ are welded together, they are moved outwardly upon longitudinal conveyor 36.

The present invention is directed to providing a lift and support system which will support such welded courses when the courses are raised to the height dictated by the center mechanical jack 140 in FIG. 5 of the patent, and the end mechanical jacks 162 in FIG. 10 of the patent. However, the system must take into account the fact that the courses may be scalene cones in which the center of the scalene cone is not the same center as the center of the courses being welded together.

As shown in FIG. 1 of the patent, the conveyor 36 extends longitudinally outboard of the ring 16.

In accordance with the present invention a limit switch 500 is mounted upon mechanical jack 162 having a contact arm 502 for contacting a tank course. Another limit switch 504 is located in the lower mechanical jack 154 in the center ring having a contact arm 506.

The conveyor 36 is interrupted outboard of the jack 162 and one or more scissors lifts and support assemblies 510, 610 and 612 are provided. This scissors lift and support assembly 510 includes a base 512 comprising a pair of channels 514 and 516 joined at their center by a smaller reinforcing channel 517. A first arm 518 is pivotably connected to base 512 by means of a transversely extending pin 520, a pair of collars 522 (FIG. 5) and bearings 524. Another arm 526 is pivotably mounted (FIG. 3) about base 512 by means of another pin 528, collars 529 and bearings 530.

In their mid-portions arms 518 and 526 telescope, (FIG. 7). Arm 526 includes a pair of channels 527 and arm 518 is U-shaped (FIG. 7). At the distal end of arm 526 is located a rectangular bracket 532 upon which is mounted course support means 533, including a roller bracket 534 upon which is mounted a first roller 536. At the distal end of arm 518 is located another rectangular bracket 542 upon which is mounted another course support means 543, a roller bracket 544 and another roller 546.

A bracket 548 is attached to rectangular bracket 532 and a cylinder 550 is attached to bracket 548 with a pin 552. A piston 554 is attached to a bracket 556 with a pin 558. Bracket 556 is attached to rectangular bracket head 560. Cylinder 550 includes an opening 562 which receives a hydraulic line 564 to supply hydraulic fluid to the cylinder. The piston returns by gravity. A lateral stability mercury switch 580 is mounted upon piston 554 in each of assemblies 510, 610 and 612.

Scissors assemblies 610 and 612 (FIG. 1) are constructed in the same manner as cylinder assembly 510. Thus a further discussion of their construction is not believed necessary.

A vertical cylinder 566 (FIG. 3) is attached to base 512 with a pin 568. A bracket 570 is attached to rectangular bracket 542 and a piston 572 is attached to bracket 570. Piston 572 has a head 574 located within cylinder 566 and another hydraulic fluid line 578 is provided, each connected to respective openings in the cylinder 566.

Figure 8:
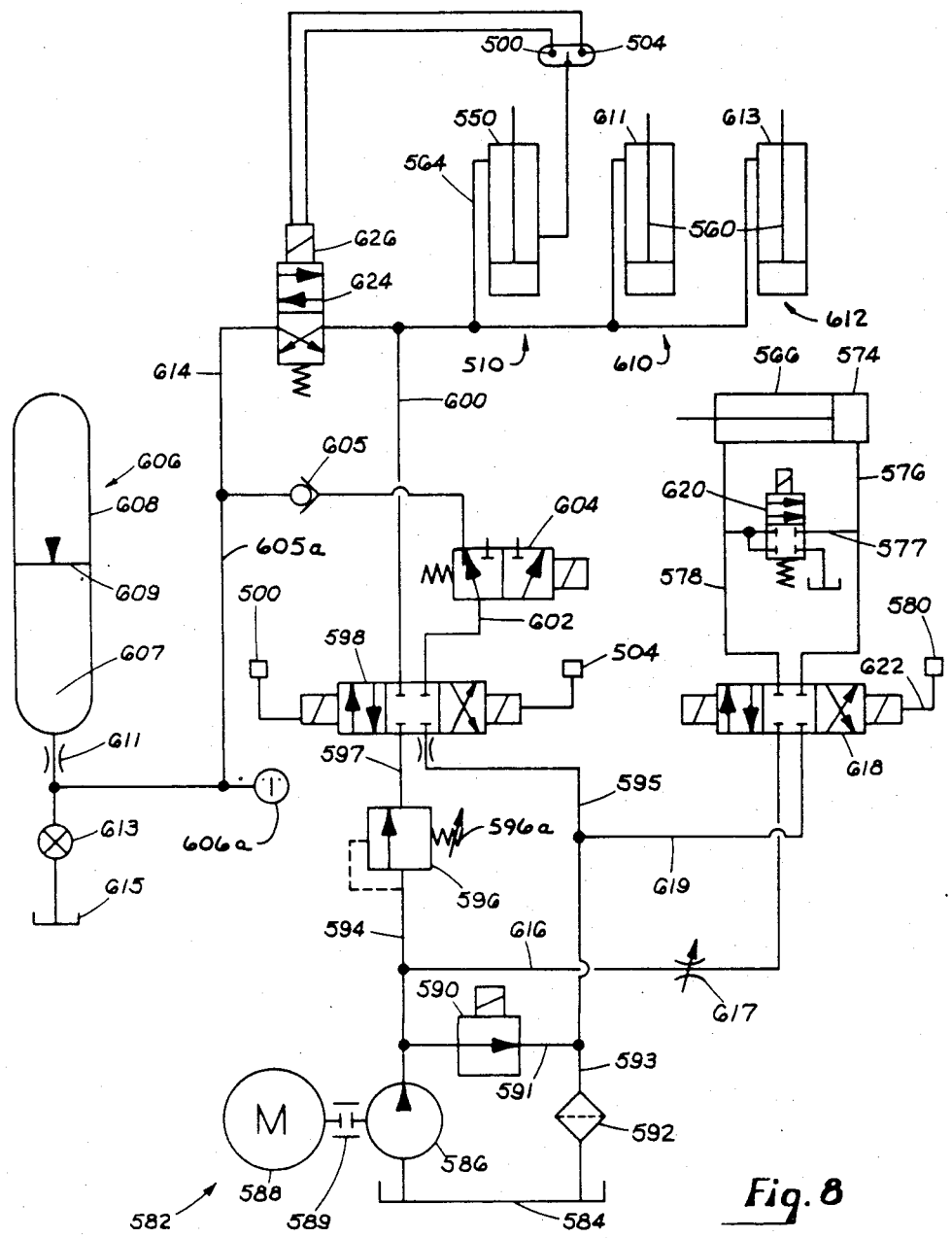
FIG. 8 is a schematic view of the hydraulic system utilized in the scissor support assembly of the present invention.

A fluid control system indicated generally at 582 in FIG. 8 includes a hydraulic fluid reservoir 584 and a pump 586 (Denison TMB 00421R pump) capable of pumping at least about six gallons of hydraulic fluid per minute. A motor 588 (Lincoln 10 H.P., 3$\phi$, 2 0/460 volt, TEFC, 215T frame motor) drives the pump through a coupling 589 (Browning JP5 coupler). In a first circuit an idling valve 590 (Rexroth DBW10B2-10/315 W120- 60NZ59/5½" solenoid operated relief valve) and a filter 592 (Char-Lynn filter) are provided.

When valve 590 is switched from the position shown, the pump supplies hydraulic fluid through a line 594 to a sequence valve 596 (Republic S6702-2-2/2-¼ P).

Sequence valve 596 directs fluid pressure through a line 616 through a control valve 617 to a control valve 618 (Rexroth 4WE6E 30/W120 NE5L with G342/5 subplate and BK-F1-1 bolt kit) which controls fluid pressure applied to lateral stability cylinder 566 (FIGS. 3 and 8). Lateral stability is achieved by rollers 546 and 536 preventing the courses $C_1$ and $C_2$ from sliding off the longitudinal center line of the apparatus.

Mercury switch 580 is connected through line 622 to lateral stability control valve 618. In one position of valve 618, fluid pressure is applied to one side of piston 574 through line 576 (FIG. 3). In the other position, fluid pressure is applied to the other side of piston 574 through line 578. A by-pass valve 620 (Waterman 1627,-3-A100 4-way valve) is also provided to by-pass cylinder 566 when the lateral stability system is turned off, for example during welding through a line 577.

After the level of fluid pressure in line 616 has increased to a point whereby the lateral stability system can effectively function, the valve 596 then directs fluid pressure through line 597 into control valve 598 (Rexroth 4WEH22E30/8LW120-60 NL/5 1' 4-way valve with G154 1-¼ subplate and BK-F2-S bolt kit). The level at which fluid pressure ia applied to line 597 is manually adjustable at 596a on valve 596.

Valve 598 is a three-position valve. In one position fluid pressure is applied through line 600 to cylinder 550 and to cylinders 611 and 613 similar to cylinder 550 in parallel. These cylinders operate scissor support assemblies 611 and 613 similar to support assembly 510 further along conveyor 36, (FIG. 1).

In another position of valve 598 fluid pressure is applied through line 602 and valve 604 (Rexroth 3WE1-0A4/W120-60NL with G67/5 subplate and BK-F1-2 bolt kit) to accumulator 606 (Green 300L-8.5-10 10 gallon accumulator, 425 lbs.) through a check valve 605 and line 605a. Accumulator 606 includes a hydraulic portion 607 and a gas portion 608 separated by a piston 609. Fluid from accumulator 606 is controlled by a throttle valve 611 (Rexroth MK 25G1/5 throttle valve). A needle valve 613 (Marsh 1514 ½' needle valve) is provided to drain accumulator 606 for servicing the equipment into container 615. A drain line 594 is provided from valve 598 which joins drain line 593. A drain line 619 is provided from valve 618.

Normally the accumulator 606 is pressurized during an off cycle at which time sequence valve 596 is shifted from the position shown to allow to allow flow to valve 598. Valve 598 is switched to an accumulator charge position through line 602. Valve 624 (Rexroth 3WEH22HD 30/BLW120-60NL/5, 1' 4-way valve with G154/5 1-¼" subplate and BK-F2-5 bolt kit) initially prevents fluid communication between the accumulator 606 and the cylinders 550, 610 and 612 as the accumulator is charged.

Motor 588 and pump 586 are utilized to charge accumulator 606 to a desired pressure of around 200 pounds per square inch. Fluid communication occurs through lines 594, 597 through the accumulator charge position of valve 598, through line 602 and valve 604, and through check valve 605 until the accumulator is charged to approximately the 200 pound level. At this point valve 606a switches valve 604 from the position shown and 624 from the blocked position and thus providing fluid communication between accumulator 606 and cylinders 510, 610 and 612. Charging of the accumulator may occur prior to lifting of courses $C_1$ and $C_2$ into position for welding.

When the courses are moved outwardly by the conveyor 36, the sequence valve 596 is actuated and the motor and pump apply fluid pressure through line 616 to lateral stability control valve 618 until the fluid pressure in this system has reached a desired level, controlled manually at 596a by valve 596, whereby the lateral stability system will function properly through mercury switch 580 in each assembly. The lateral stability system thus functions when welded courses $C_1$ and $C_2$ are located on rollers 533, 543 to maintain the courses in place upon the rollers. Also at this point another course $C_3$ is placed on conveyor 36 and extends into ring 14 adjacent course $C_1$. When this pressure level is reached, valve 596 will then allow fluid pressure to again pass through line 597 and through valve 598. Valve 598 is placed in the cylinder charge position and fluid pressure is applied to the cylinders 550, 610 and 612 through line 600.

It will be recalled that one limit switch 504 is located in the center jack 14 and the other limit switch 500 is located in the outer ring 16. Since the accumulator has been pressurized, the lateral stability circuit 616 activated, and the fluid pressure applied to the horizontal cylinders 550, 610 and 612, the welded courses $C_1$ and $C_2$ and the new course to be welded $C_3$ are ready to be lifted.

This is begun by activating the screw jacks 140 shown in FIG. 5 of U.S. Pat. No. 4,081,651. As this occurs there is immediately an imbalance between the vertical height of switch 504 and switch 500. This will immediately cause fluid pressure to flow by virtue of the pump 586 into the lifting cylinders 550, 610 and 612, and as shown in FIG. 3, the pistons 554 will be moved from left to right to move rollers 536 and 546 closer together to raise the cantilevered courses. If the flow of fluid pressure occurs into the cylinders 550, 610 and 612, and occurs more rapidly than does movement of the screw jacks, then switches 500 and/or 504 will signal a reduction in the rate of fluid flow. It is thus apparent that switches 500 and 504 will control the flow of fluid into the cylinders 500, 610 and 612 to allow the cantilevered courses to rise with the new course $C_1$ to be welded in place.

After the desired height is reached as determined by the mechanical jacks in the center ring, the seek-and-find hydraulic jacks 120 and 160 in the rings 12 and 16 are activated, as described in U.S. Pat. No. 4,081,165. The hydraulic jacks extend outwardly until the same force is present on each jack, and grip and clamp the cantilevered course and the new course in position for welding.

Also when the desired height has been reached, one or both of switches 500 and 504 are effective to move valve 598 to a position where there is no longer fluid communication between the pump 586 and the cylinders 550, 610 and 612. Similarly, the lateral stability system is disengaged. Valve 620 is switched to the bypass position whereby fluid will flow through line 577 and will no longer flow through cylinder 574. However, fluid communication will remain between accumulator 600 and cylinders 550, 610 and 612 through line 614 and valve 624.

It will be apparent that the pressure level selected for the accumulator 606 is such as to generally counterbalance the weight of the assembled courses.

It will be recalled that the present invention is applicable to the welding of conventional tank courses or to other shaped generally circular tanks including the scalene cone type of tank.

Figure 9:
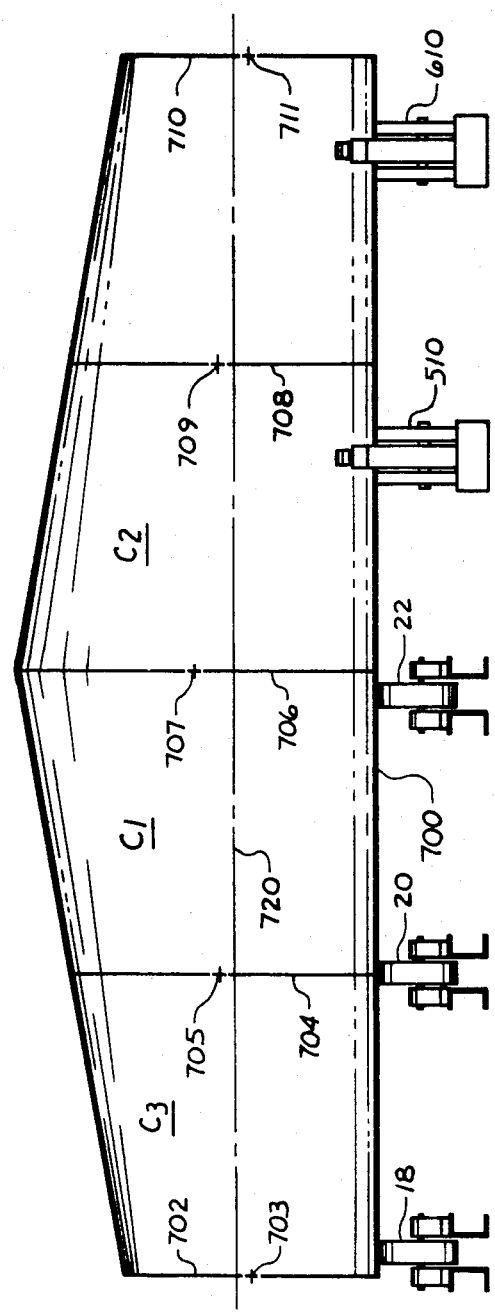
FIG. 9 is a side elevation view illustrating a scalene cone.

A scalene cone tank is illustrated in FIGS. 3 and 9. As shown in FIG. 9, a scalene cone type tank includes a tank top or base 700. Extending from this base are a plurality of imaginary circles 702, 704 and 706 of gradually increasing diameter, and circles 708 and 710 with decreasing diameter. The center of these respective circles is displaced with respect to one another. Thus in FIG. 9 the center 703 of the circle 702 is spaced downwardly from the center of rotation. In FIG. 3 the center 705 of circle 704 is displaced upwardly a distance d from the center of rotation. In many instances a large circle 706 provides the mid-point of the tank and a series of decreasing diameter circles 708 are provided as illustrated at 710. Circles 706, 708, 710 have centers 707, 709, and 711. All circles have a common center of rotation 720.

If one visualizes the path of these varying diameter circles, all having a common base 700, because of the different centers of the circles, a wobbling path will be observed as the scalene cone is rotated about a common center of rotation. This will be true, notwithstanding the fact that the welded courses $C_1$ and $C_2$ are clamped by the hydraulic jacks in the outer ring 16. For example, as shown in FIG. 3, the center 705 of circle 704 is initially located above the center of rotation 720. However in making one revolution the center 705 will make the path shown in FIG. 3. The dotted line illustrated in FIG. 3 illustrates the lowermost position of the circle 704. The line having open spaces illustrates the uppermost position of the circle 704. The dotted and dashed lines illustrate the neutral position of the circle 704. However, because the accumulator 606 is in fluid communication with the supporting horizontal scissor jacks 550, 610 and 612, this wobbling motion of the scalene cones can be accomodated.

For example, as illustrated in FIG. 1, courses $C_1$ and $C_2$ may have already been internally circumferentially welded together and course $C_3$ is the one to be added. Internal circumferential welding occurs generally along the line of the diameter of the circle 704 until a weld is formed along the entire circumference in the manner described in U.S. Pat. No. 4,081,651.

After this weld occurs, it is necessary to lower the assembly of courses $C_3$, $C_1$ and $C_2$. In order to effect this, the hydraulic jacks in the end rings 12 and 16 are activated such as to remove their pistons and engaging surfaces from the courses. When this is accomplished, the next step is to begin lowering the mechanical jacks in the center ring 14. When this occurs the limit switch 504 immediately activates the switch 620 to reactivate mercury switch 580 and lateral stability cylinder 574. Similarly, valve 598 is again activated and valve 624 remains in its present position. Thus as the assembled tank courses are lowered, in FIG. 3, hydraulic fluid flows from right to left and the piston 554 also moves from right to left. Hydraulic fluid flows out of the cylinders 550, 610 and 612 and downwardly through line 600 and drain line 595, 593, valve 592 into sump 584.

To briefly summarize, the limit switches 500 and 504 are used to control raising of the tank courses in cooperation with the extendable screw jacks 140 in the center ring. As the jack 156 (FIG. 2) is initially raised, this shows a difference in height above the jack 500 and that this causes fluid to flow in the cylinders 550, 610 and 612 and causes a lifting action as fluid flows through conduit 564 to raise the cantilevered courses. Fluid flows at a greater or less extent through conduit 564 until the center screw jack 140 has reached the necessary height. A corresponding height is obtained by the scissors assemblies 510, 610 and 612.

As the cantilevered courses are raised, the mercury switch 580 controls flow of fluid through lines 576 and 578 into cylinder 566, as shown in FIGS. 3 and 8, to control lateral movement of the cantilevered courses.

The cantilevered courses and a new course to be welded thereon is held in fixed relation by the screw jacks 140 and the hydraulic seek and find jacks 120 and 160.

Either prior to or during the raising of the cantilevered courses, the accumulator 606 is pressurized. It will assume a pressure to compensate for the weight of the cantilevered course. Thus as the courses are raised, there is fluid communication between the pump 586 through the valves 596 and 598 through line 600 into the cylinders 550, 611, and 613. Furthermore, there is fluid flow into the accumulator. However, once the courses have reached the desired height for welding, the pump is turned off, the lateral stability system and valve 620 are turned off, and the cylinders 550, 611 and 613 are in fluid communication with the accumulator 606.

FIG. 9 illustrates scalene cone courses. A scalene cone course includes a base 700. A series of imaginary circles of different diameters are then drawable from the base 700. Thus at one end an imaginary circle 702 has a center 703. An imaginary circle 704 has a center 705 spaced upwardly from the center of rotation of the scalene cone 720. Similarly, generally at the mid-point, an imaginary circle 706 has a center 707 displaced considerably from the center of rotation of the cone. Imaginary circles 708 and 710 have similar centers 709; and 711 located below the axis of rotation of the cone.

Thus when the cone is rotated, if an imaginary circle 704 is taken as an example, if FIG. 3 is referred to, the imaginary circle has a center 705 which is displaced upwardly from the center of rotation 720. Thus when the scalene cone assumes its initial position, the center 705 is displaced above the center of rotation 720 and the course assumes the position shown in dot and dash lines in FIG. 3. As the course is rotated at its lowermost point, the course assumes the position shown in dotted lines. Similarly, at its highest point, the course assumes the position shown in long dotted lines. Thus it is seen that the scalene cone follows a wobbling path as it is rotated. As this occurs, fluid is displaced from the cylinders 550, 611 and 613, and is pressurized back into the accumulator. Similarly, when the cone is in the uppermost position, fluid will flow from the accumulator into the cylinders 550, 611 and 614. Thus there is a back and forth flow of fluid as the scalene cone is rotated about the axis 720.

Since the accumulator is pressurized to balance the weight of the scalene cone, the accumulator provides an effective support for the wobbling action which occurs as the cantilevered scalene cone is rotated.

After all of the fluid has flown out of the cylinders 550, 610 and 612 and the assembled courses have been lowered to their bottommost point in FIG. 5 of U.S. Patent 4,081,651, the conveyor 36 shown in FIG. 1 is used to move the assembly outwardly and a new course is ready to be inserted.

Alternatively, if an entire tank has been formed, the conveyor is used to move the tank to another position.

What is claimed is:

1. In apparatus for supporting and rotating a pair of hollow tank sections of generally circular cross section, including scalene and frusto-conical tank sections, during welding of the sections in end-to-end abutting relation to form an elongated tank, including three longitudinally spaced, axially aligned, rotatable rings which define a welding cage; said center ring including a plurality of circumferentially spaced, radially directed jacks, each extendable the same distance regardless of the resistance encountered by a particular jack to force the abutting edges of the tank sections into a precise circular cross section and support and hold the abutting edges in aligned relation during rotation and welding; said side rings including radially directed jacks in the bottom for lifting the sections, and circumferentially spaced radially directed jacks of the seek and find type that automatically extend until all jacks exert the same force on the tank sections extending from each side of the center ring to thereby support the tank sections for rotation about the common axis of the three rings, regardless of whether the tank sections are of cylindrical, right frusto-conical or scalene frusto-conical shape; a longitudinally extending conveyor which extends within the welding cage and on either side of the welding cage for moving adjacent tank sections longitudinally toward each other into abutting engagement for welding in the center ring, and for moving welded sections longitudinally of the cage, the improvement comprising: a support and lift assembly for welded tank courses located outboard of said three ring cage to move the welded tank courses into position for another course to be welded on; said conveyor being discontinuous at one or more positions and a scissors support and lift assembly located at said discontinuous positions; said scissors support and lift assembly including a transversely extending base; a pair of transversely extending arms pivotably mounted respectively at each end of said base; said arms extending transversely and one arm crossing the other; a piston pivotably connected to one of the arms which extends generally horizontally into a cylinder extending horizontally pivotably connected to the other arm; course support means mounted at the end of each arm to support welded tank courses; a first vertical stability limit switch located on the upper surface of the lowest jack in the center ring; a second vertical stability limit switch located on a jack outboard of said center ring; whereby fluid pressure applied to said horizontal cylinder controlled by said first and second limit switches displaces the piston and moves said arms and course support means vertically to raise a tank course until vertically aligned with said upper surface of said lowest jack in said center ring.

2. Improved apparatus according to claim 1 including a second piston extending vertically between said base and one of said arms and extending into a second cylinder extending vertically and connected to the other of the base and said arm; a lateral stability limit switch located on one of said horizontal cylinder or horizontal piston which controls the flow of fluid to said vertical cylinder to control lateral stability of said welded courses.

3. Improved apparatus according to claim 2 including a control system for said support and lift system including a fluid pump; said pump applying fluid pressure to said horizontal cylinder through a control valve.

4. Improved apparatus according to claim 3 wherein said pump applies fluid pressure to a fluid accumulator having a hydraulic chamber and an air chamber separated by a piston.

5. Improved apparatus according to claim 4 wherein said pump also applies fluid pressure to said vertical cylinder.

6. Improved apparatus according to claim 4 wherein when said courses are rotated, said courses are cushioned by said horizontally extending piston and cylinder and said air chamber.

7. An improved apparatus according to claim 1 wherein scalene cone tank courses are internally circumferentially welded and wherein the apparatus supports elongated scalene cone tank sections and follows the eccentricities of the tank contour as to scalene cone configuration.

8. An improved apparatus according to claim 2 wherein said accumulator is so sized as to balance and support an initial load an support rollers and to allow said rollers to follow eccentricities of a tank course without appreciable change in fluid pressure, thereby maintaining adequate load on turning rolls located under the cage at all times.

9. An apparatus for supporting and rotating a pair of hollow tank sections of generally circular cross section, including scalene and frusto-conical tank sections, during welding of the sections in end-to-end abutting relation to form an elongated tank, including at least two longitudinally spaced, axially aligned, rotatable rings which define a welding cage; at least one ring including a plurality of circumferentially spaced, radially directed jacks to force the abutting edges of the tank sections into a precise circular cross section and support and hold the abutting edges in aligned relation during rotation and welding; said rings including radially directed jacks in the bottom for lifting the sections, to thereby support the tank sections for rotation about a common axis; a longitudinally extending conveyor which extends within the welding cage and on either side of the welding cage for moving adjacent tank sections longitudinally toward each other into abutting engagement for welding in the center ring, and for moving welded sections longitudinally of the cage, the improvement comprising: a support and lift assembly for tank courses located outboard of said cage to move the welded tank courses into position for another course to be welded on; said conveyor being discontinuous at one or more positions and a scissors support and lift assembly located at said discontinuous positions; said scissors support and lift assembly including a transversely extending base; a pair of transversely extending arms pivotably mounted respectively at each end of said base; said arms extending transversely and one arm crossing the other; a piston pivotably connected to one of the arms which extends generally horizontally into a cylinder extending horizontally pivotably connected to the other arm; course support means mounted at the end of each arm to support welded tank courses; a first vertical stability limit switch located on the upper surface of the lowest jack in said one ring; a second vertical stability limit switch located on a jack outboard of said center ring; whereby fluid pressure applied to said horizontal cylinder controlled by said first and second limit switches displaces the piston and moves said arms and course support means vertically to raise a tank course until vertically aligned with said upper surface of said lowest jack in said center ring.

10. Improved apparatus according to claim 9, including a second piston extending vertically between said base and one of said arms and extending into a second cylinder extending vertically and connected to the other of the base and said arm; a lateral stability limit switch located on one of said horizontal cylinder or horizontal piston which controls the flow of fluid to said vertical cylinder to control lateral stability of said welded courses.

11. Improved apparatus according to claim 10, including a control system for said support and lift system including a fluid pump; said pump applying fluid pressure to said horizontal cylinder through a control valve.

12. Improved apparatus according to claim 11, wherein said pump applies fluid pressure to a fluid accumulator having a hydraulic chamber and an air chamber separated by a piston.

13. Improved apparatus according to claim 12, wherein said pump also applies fluid pressure to said vertical cylinder.

14. Improved apparatus according to claim 12, wherein when said courses are rotated, said courses are cushioned by said horizontally extending piston and cylinder and said air chamber.

15. An improved apparatus according to claim 9, wherein scalene cone tank courses are internally circumferentially welded and wherein the apparatus supports elongated scalene cone tank sections and follows the eccentricities of the tank contour as to scalene cone configuration.

16. An improved apparatus according to claim 12, wherein said accumulator is so sized as to balance and support an initial load on support rollers and to allow said rollers to follow eccentricities of a tank course without appreciable change in fluid pressure, thereby maintaining adequate load on turning rolls located under said cage at all times.

17. A support and lift assembly for welded tank courses used to connect adjacent tank sections comprising: a scissors support and lift assembly located outboard of a tank cage; said scissor support including a pair of transversely extending arms; a piston pivotably connected to one of said arms which extends into a cylinder pivotably connected to the other said arm; roller support means rotatably mounted at the end portion of each said arm to support tank sections; limit switch means located at least partially within said cage for controlling the height of tank sections to be lifted; means for applying fluid pressure to said cylinder controlled by said limit switch means to displace said piston and move said arms and roller support means vertically to raise a tank section into connection position.

18. An assembly according to claim 17, including a second piston extending between a base and one of said arms and extending into a second cylinder and connected to the other of the base and said arm, and a lateral stability limit switch located on a generally horizontal portion of the apparatus which controls the flow of fluid to said second cylinder to control lateral stability.

19. A support and lift assembly for connected tank sections comprising: a scissors support and lift assembly located outboard of a tank cage; said support and lift assembly further including a pair of transversely extending arms; a first piston pivotably connected to one of said arms which extends generally horizontally into a first horizontally extending cylinder pivotably connected to the other arm; tank support means rotatably mounted at the end portion of each arm to support connected tank sections; a second piston extending generally vertically between a base and one of the arms and extending into a second cylinder connected to the other of said base and arms; vertical height limit switch means in said cage for controlling the height of said tank sections; means for applying fluid pressure to said first horizontal cylinder controlled by said limit switch means whereby said piston is displaced and said arms and respective support means are moved vertically to raise a tank section into connecting position.

20. An assembly according to claim 19, including a lateral stability limit switch located on a horizontal portion of the apparatus which controls the flow of fluid to said vertical cylinder to control lateral stability.

21. An assembly according to claim 20, including a control system for support and lift system including fluid pump means; said pump means effective to apply fluid pressure to said first cylinder and to a fluid accumulator adapted to support said tank sections.

* * * * *

UNITED STATES PATENT AND TRADEMARK OFFICE
CERTIFICATE OF CORRECTION

PATENT NO. : 4,504,047
DATED : March 12, 1985
INVENTOR(S) : Steven L. Jantzen

It is certified that error appears in the above-identified patent and that said Letters Patent is hereby corrected as shown below:

Column 4, line 27, delete "1'" and insert therefor ---1"---; line 40, delete "Green" and insert therefor ---Greer---; line 46, after "Marsh 1514" delete "1/2'" and insert therefor ---1/2"---; line 48, delete "594" and insert therefor ---595---; line 56, delete "1'" and insert therefor ---1"---.

Column 7, line 58, delete "614" and insert therefor ---613---.

Column 9, line 22, delete "an" 2nd occurrence and insert therefor ---on---.

Signed and Sealed this

First Day of October 1985

[SEAL]

Attest:

DONALD J. QUIGG

Attesting Officer

Commissioner of Patents and
Trademarks—Designate